United States Patent
Meyuhas

(10) Patent No.: US 11,570,720 B2
(45) Date of Patent: Jan. 31, 2023

(54) DEVICES AND METHODS EMPLOYING PREDICTIVE BACK-OFF ESTIMATION SCHEMES FOR SAR COMPLIANCE

(71) Applicant: Intel Corporation, Santa Clara, CA (US)

(72) Inventor: Gil Meyuhas, Tel-Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/476,509

(22) Filed: Sep. 16, 2021

(65) Prior Publication Data

US 2022/0201625 A1    Jun. 23, 2022

(30) Foreign Application Priority Data

Dec. 23, 2020  (EP) .................................... 20216881

(51) Int. Cl.
*H04W 52/26* (2009.01)
*H04B 1/3827* (2015.01)
*H04W 52/30* (2009.01)

(52) U.S. Cl.
CPC ........ *H04W 52/267* (2013.01); *H04B 1/3838* (2013.01); *H04W 52/30* (2013.01)

(58) Field of Classification Search
CPC .............. H04W 52/267; H04W 52/30; H04W 52/0258; H04W 52/0277; H04W 52/245; H04W 52/228; H04W 52/225; H04W 52/367; H04B 1/3838; H04B 17/101; Y02D 30/70; H04L 1/0061
See application file for complete search history.

(56) References Cited

U.S. PATENT DOCUMENTS

| 8,755,832 B2 * | 6/2014 | Baldemair .......... H04W 52/367 |
| | | 455/67.11 |
| 2003/0228875 A1 | 12/2003 | Alapuranen |
| 2013/0169348 A1 | 7/2013 | Shi |

(Continued)

FOREIGN PATENT DOCUMENTS

| EP | 3975628 A1 * | 3/2022 | .......... H04B 1/3838 |
| WO | WO-2022101073 A1 * | 5/2022 | |

OTHER PUBLICATIONS

European Search Report issued for the corresponding European application No. EP 20 216 881.1, dated Jun. 30, 2021, 6 pages (for informational purposes only).

*Primary Examiner* — Lana N Le
(74) *Attorney, Agent, or Firm* — Viering, Jentschura & Partner mbB

(57) ABSTRACT

Devices and methods for providing communication channel congestion levels to determine whether to apply power and/or time back-offs, and if so, how to apply said back-offs. The device may be configured to estimate a congestion level of a communication channel, wherein the congestion level indicates an availability for transmissions over one or more time periods; determine a projected time back-off for an ensuing packet transmission based on the congestion level; and determine whether to apply a transmission back-off based on the projected time back-off and a transmission energy budget based on one or more time-averaging specific absorption rate (TAS) parameters for regulating a radiation exposure to a user of the device.

20 Claims, 8 Drawing Sheets

(56) References Cited

U.S. PATENT DOCUMENTS

| | | | |
|---|---|---|---|
| 2015/0201387 A1* | 7/2015 | Khawand | H04W 52/265 |
| | | | 455/452.1 |
| 2015/0341869 A1* | 11/2015 | Sen | H04W 52/346 |
| | | | 455/522 |
| 2017/0034853 A1* | 2/2017 | Rune | H04W 52/0216 |
| 2020/0076462 A1 | 3/2020 | Narayan et al. | |
| 2021/0297959 A1* | 9/2021 | Zhou | H04B 7/0602 |

* cited by examiner

DEVICES AND METHODS EMPLOYING PREDICTIVE BACK-OFF ESTIMATION SCHEMES FOR SAR COMPLIANCE

CROSS-REFERENCE TO RELATED APPLICATION

This application claims priority under 35 U.S.C. § 119 to European Application No. 20 21 6881.1 filed on Dec. 23, 2020, which is herein incorporated by reference in its entirety.

TECHNICAL FIELD

Various aspects relate generally to wireless communications and radiation exposure transmit power control techniques.

BACKGROUND

New communication technologies, such as 5G New Radio (NR), WiGig, and Wireless Local Area Networks (WLANs) such as WiFi, utilize higher radio frequencies in the millimeter wave (mmWave) spectrum and utilize beamforming to improve throughput and reduce frequency with existing wireless systems. While these techniques provide many advantages in these newer wireless systems, they may increase radio frequency (RF) radiation in the environment, including to users. For example, when a device uses beamforming to focus high RF transmissions in a narrow direction, the resulting beam may deliver elevated levels of radiation energy to a focused area. When this focused area is pointed at a user, the device may deliver high levels of harmful radiation to the user and the signal quality may also be significantly degraded. The amount of radiation energy emitted absorbed by a unit of mass of a user over time may be defined as the specific absorption rate (SAR).

Various regulators, including the Federal Communications Commission (FCC) and the International Commission on Non-Ionizing Radiation Protection (ICNIRP), and standardization bodies like the 3$^{rd}$ Generation Partnership Project (3GPP) have introduced SAR measures that limit the amount of radiation that a device can deliver to users. In response, methods and devices that implement time-averaging SAR (TAS) mechanisms have been introduced to comply with these regulatory measures.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
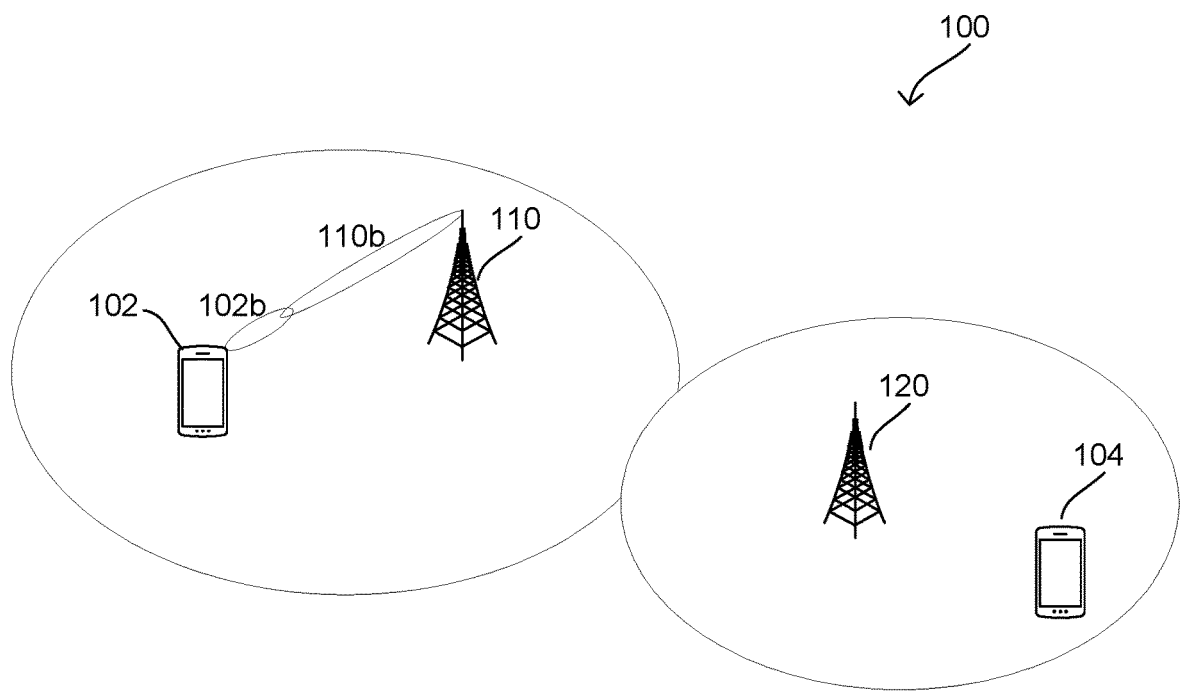
FIG. 1 exemplarily shows a radio communication network according to some aspects.

TAS mechanisms monitor the power used in transmissions over a time period (e.g., an averaging window) in order to comply with regulations issued by authorities and may include utilizing a transmission power energy budget available over the time period to ensure that SAR limits are not exceeded. Devices may be configured to control the transmission (Tx) power by applying a power back-off (PBO) that limits the Tx power to lower levels or by applying a time back-off (TBO) that prevents transmissions for a certain period of time.

Conventional TAS algorithms and schemes aggregate power over a time period to regulate the total energy transmitted during the time period to comply with regulations set forth by governing bodies that are intended to limit the amount of radiation exposure to users. These conventional TAS mechanisms compare the amount of spent energy, or the average spent energy, to a TAS energy budget available for the time period. If the energy budget is nearly spent, or within certain margins, conventional TAS mechanisms may apply a back-off (BO) in the form of a PBO or a TBO. While each of these options has their share of advantages and disadvantages, such as differences in throughput, connection range, and latencies, TAS mechanisms are configured to decide between using each of the two options (PBO vs TBO) and/or determine whether to alternate or use a combination of the two.

In scenarios where the communication channel is congested (e.g., there is an overload of devices attempting to communicate with a common network access node), a device may be configured to not transmit communications for a certain time period according to different wireless communication protocols, e.g., in WLAN, this may result from a clear channel assessment (CCA) energy detection (ED) sensing. In other words, because the communication channel may be detected as being overloaded and busy, the device may not attempt communications for a certain period of time and wait until the channel is more accessible. Conventional TAS mechanisms, however, do not consider the congestion levels in a communication channel when determining whether and how to apply any BOs. Instead, conventional TAS mechanisms solely apply BOs to comply with SAR considerations based on past transmission energy usage (i.e., historical data). Accordingly, conventional TAS mechanisms may, for example, apply an unneeded BO for a current data packet transmission when a BO induced by the congestion levels is about to be applied in the near-future and would more than compensate for the energy transmitted at the current time for TAS transmission energy budget considerations.

Put differently, conventional TAS mechanisms fail to account for projected future behavior and apply BOs only based on a past history data of Tx power. These conventional mechanisms do not predict Tx duty cycles (DC) induced by congestion and do not factor in these effects for purposes of complying with TAS budgets while ensuring a robust communication link is maintained. Furthermore, these conventional TAS mechanisms may implement TBOs and/or PBOs when they may not be actually needed. For example, conventional TAS mechanisms may limit system performance by not allowing a device to use the TAS transmission energy budget to its full extent by implementing greater than needed safety margins on energy usage and not being able to use projected TBOs (i.e., TBOs induced by congestion estimations) when the history usage is on the end boundary of a time period or time window.

If devices were to be made aware of future induced BOs based on congestion levels, the devices could be configured to better fully exploit the TAS transmission energy budget. The device and methods of this disclosure are configured to obtain this knowledge of future induced BOs based on current congestion levels and utilize this knowledge to optimize current transmission power levels while allowing the device to comply with SAR regulations and limits. In this manner, the methods and devices provided herein are better able to exploit the TAS power budget and provide numerous advantages in wireless communications systems.

In some aspects, methods and devices are configured to compute a level of congestion in a communication channel to determine a projected TBO in order determine whether to adjust a power level of a transmitter. The methods and devices provide additional measures for TAS mechanisms that, in addition to controlling or limiting the Tx target power based on history of energy usage and TAS regulatory parameters, control the Tx target power based on predictive future energy usage. This congestion induced DC may be used to determine a projected TBO (projTBO) for limiting future transmissions during a contention window, for example, thereby passing the limiting of the power of a transmitter on to future time periods. Accordingly, by taking this predictive future behavior into account, the methods and devices described herein may refuse to apply requested BOs (either PBOs or TBOs) at a present time since a future BO will be forced by the congestion levels, and this future BO will compensate for present TX behavior and allow for compliance with the SAR regulatory parameters even if higher Tx levels are used in the present.

The methods and devices of this disclosure provide numerous advantages, including (but not limited to): allowing Tx at higher power levels while complying with SAR regulatory constraints; improving TAS energy budget usage efficiency; reducing channel collisions; maximizing Tx throughput; reducing latencies; improving cell and spectral density of wireless systems by reducing time spent on transmission over the air (OTA) due to decreased usage of PBOs; and improving connection range.

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wireless Local Area Network (WLAN) Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically colocated antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network," "wireless network", "communication network," or the like, as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" may encompass one or both of transmitting and receiving, i.e., unidirectional or bidirectional communication in one or both of the incoming and outgoing directions. The term "calculate" may encompass both 'direct' calculations via a mathematical expression/formula/relationship and 'indirect' calculations via lookup or hash tables and other array indexing or searching operations.

Figure 2:
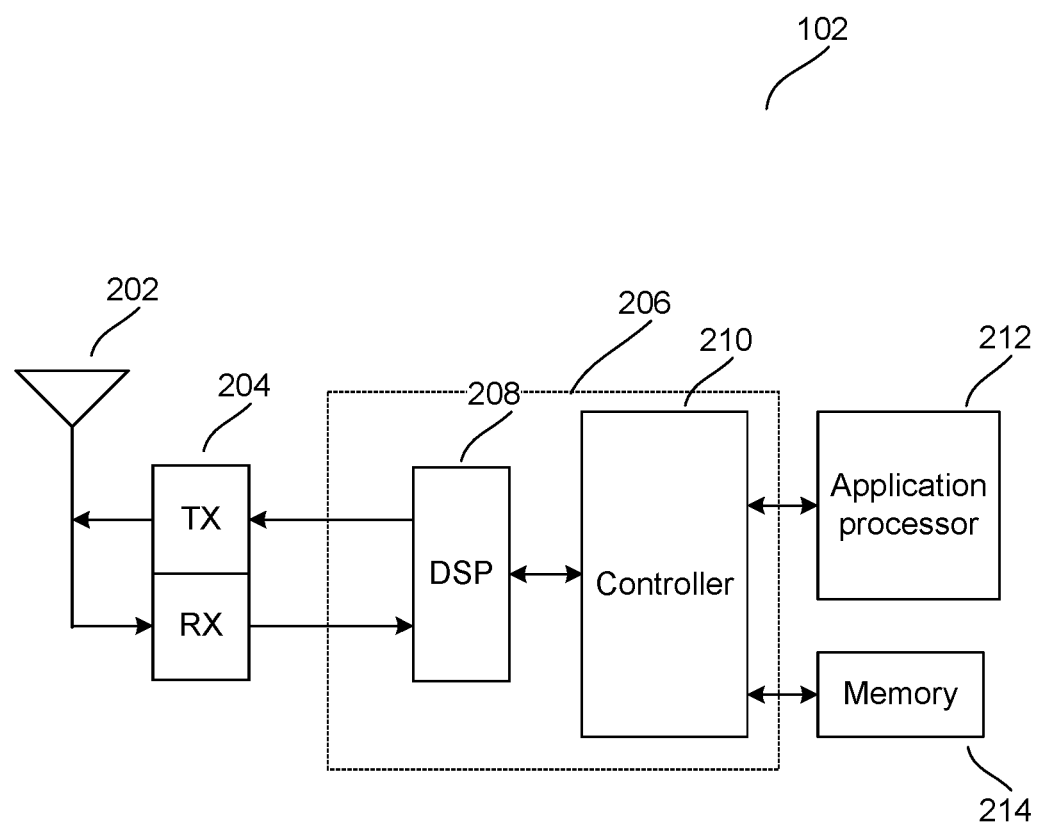
FIG. 2 exemplarily shows an internal configuration of terminal device according to some aspects.

FIGS. 1 and 2 depict an exemplary network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., 5G, NR, LTE, or other 3rd Generation Partnership Project (3GPP) networks, WLAN/WiFi, Bluetooth, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WLAN APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WLAN, mmWave, etc., any of which may be applicable to radio communication network 100.

As shown in radio communication network 100, terminal device 102 and network access node 110 may each use beamforming techniques 102b and 110b, respectively, for communicating with one another. Each may both have at least one RF chain and multi-antenna arrays. Accordingly, the devices shown in network 100 may be capable of bidirectional beamforming. If a user is in the direction of the beam 102b, for example, the user may be subject to increased SAR levels. In order to comply with regulatory measures, terminal device 102 may need to implement TAS mechanisms so that the amount of energy transmitted in the direction of the user does not violate (i.e., go over) a TAS energy budget for a given period of time. However, in addition to complying with these regulatory measures, terminal device 102 must also attempt to maintain a robust wireless link with network access node 110 to ensure communication quality is not degraded.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a processor configured to execute protocol stack software (retrieved from a controller memory) and subsequently control the radio communication components of terminal device 102 to transmit and receive communication signals in accordance with the corresponding protocol stack control logic defined in the protocol stack software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and protocol controller 210 may include separate components or instances dedicated to different radio communication technologies and/or unified components that are shared between different radio communication technologies. For example, in some aspects protocol controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and protocol controller 210 are shown as individual components in FIG. 2, in some aspects antenna system 202, RF transceiver 204, digital signal processor 208, and/or protocol controller 210 may encompass separate components dedicated to different radio communication technologies.

The terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 120. In the event that the current radio access connection degrades, terminal devices 102 or 104 may seek a new radio access connection with another network access node of radio communication network 100; for example, terminal device 104 may move from the coverage area of network access node 120 into the coverage area of network access node 110. As a result, the radio access connection with network access node 120 may degrade, which terminal device 104 may detect via radio measurements such as signal strength or signal quality measurements of network access node 120.

Figure 3:
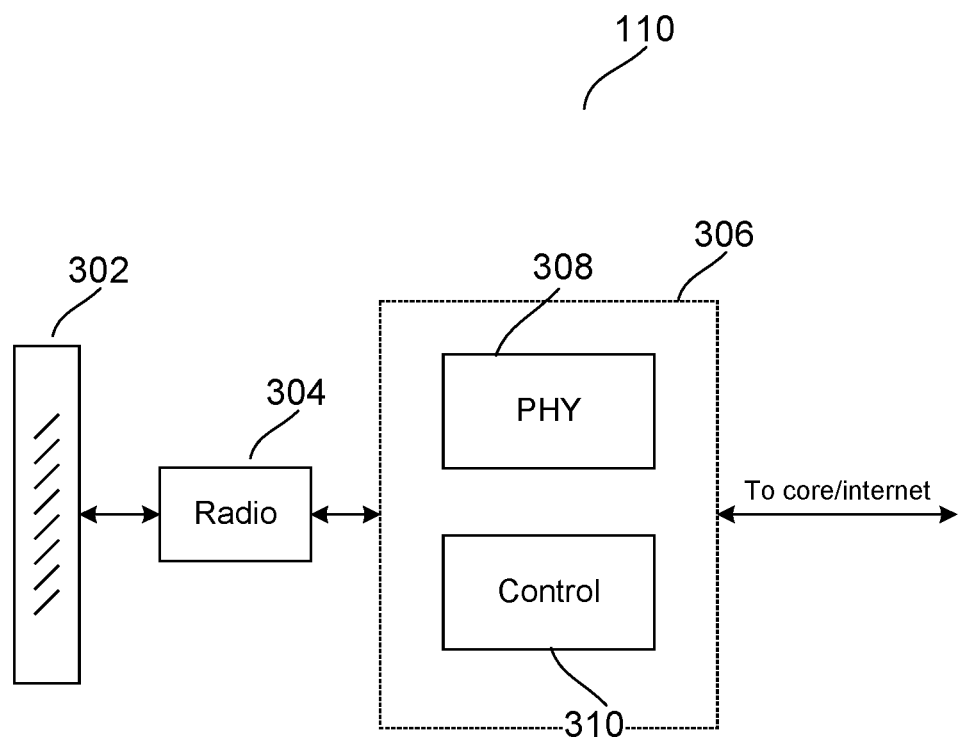
FIG. 3 exemplarily shows an internal configuration of a network access node in some aspects.

FIG. 3 shows an exemplary internal configuration of a network access node, such as network access node 110, according to some aspects. As shown in FIG. 3, network access node 110 may include antenna system 302, radio transceiver 304, and baseband subsystem 306 (including physical layer processor 308 and protocol controller 310). In an abridged overview of the operation of network access node 110, network access node 110 may transmit and receive wireless signals via antenna system 302, which may be an antenna array including multiple antennas. Radio transceiver 304 may perform transmit and receive RF processing to convert outgoing baseband samples from baseband subsystem 306 into analog radio signals to provide to antenna system 302 for radio transmission and to convert incoming analog radio signals received from antenna system 302 into baseband samples to provide to baseband subsystem 306. Physical layer processor 308 may be configured to perform transmit and receive PHY processing on baseband samples received from radio transceiver 304 to provide to controller 310 and on baseband samples received from controller 310 to provide to radio transceiver 304. Controller 310 may control the communication functionality of network access node 110 according to the corresponding radio communication technology protocols, which may include exercising control over antenna system 302, radio transceiver 304, and physical layer processor 308. Each of radio transceiver 304, physical layer processor 308, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 304 may be a radio transceiver including digital and analog radio frequency processing and amplification circuitry. In some aspects, radio transceiver 304 may be a software-defined radio (SDR) component implemented as a processor configured to execute software-defined instructions that specify radio frequency processing routines. In some aspects, physical layer processor 308 may include a processor and one or more hardware accelerators, wherein the processor is configured to control physical layer processing and offload certain processing tasks to the one or more hardware accelerators. In some aspects, controller 310 may be a controller configured to execute software-defined instructions that specify upper-layer control functions. In some aspects, controller 310 may be limited to radio communication protocol stack layer functions, while in other aspects controller 310 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

In order to comply with SAR thresholds imposed by regulatory institutions, devices may be configured to limit their Tx power over certain time periods by implementing TAS mechanisms. In some aspects of this disclosure, methods and devices provide improved TAS schemes that control Tx target powers with PBOs and/or TBOs by predicting future energy usage based on current congestion levels. These methods and devices are configured to measure and/or estimate communication channel congestion levels to determine future congestion-induced duty cycles (DCs), which in turn are used to determine projected TBOs (projTBOs).

Since the projTBO will not allow transmissions for a certain time, and therefore impact the energy usage of the TAS transmission energy budget, determining the projTBO may enable the elimination or reduction of currently requested BOs while still complying with a transmission energy budget. In other words, using the projTBO, the device may adjust or ignore the requested BOs. In some aspects, the requested BOs may be based on complying with a TAS transmission energy budget or the requested BOs may be issued for regulating a chip temperature to cool or stabilize chip temperatures.

In the aspect of complying with the TAS transmission energy budget, the methods and devices described herein enlarge the TAS credit energy balance for current use. As congestion levels increase, the ensuing methods and devices implement a TAS mechanism that reduces the Tx energy safety margins by allowing use of the remaining energy budget it might save for future use. Other advantages include the reduction of channel collisions and the improvement of range.

Figure 4:
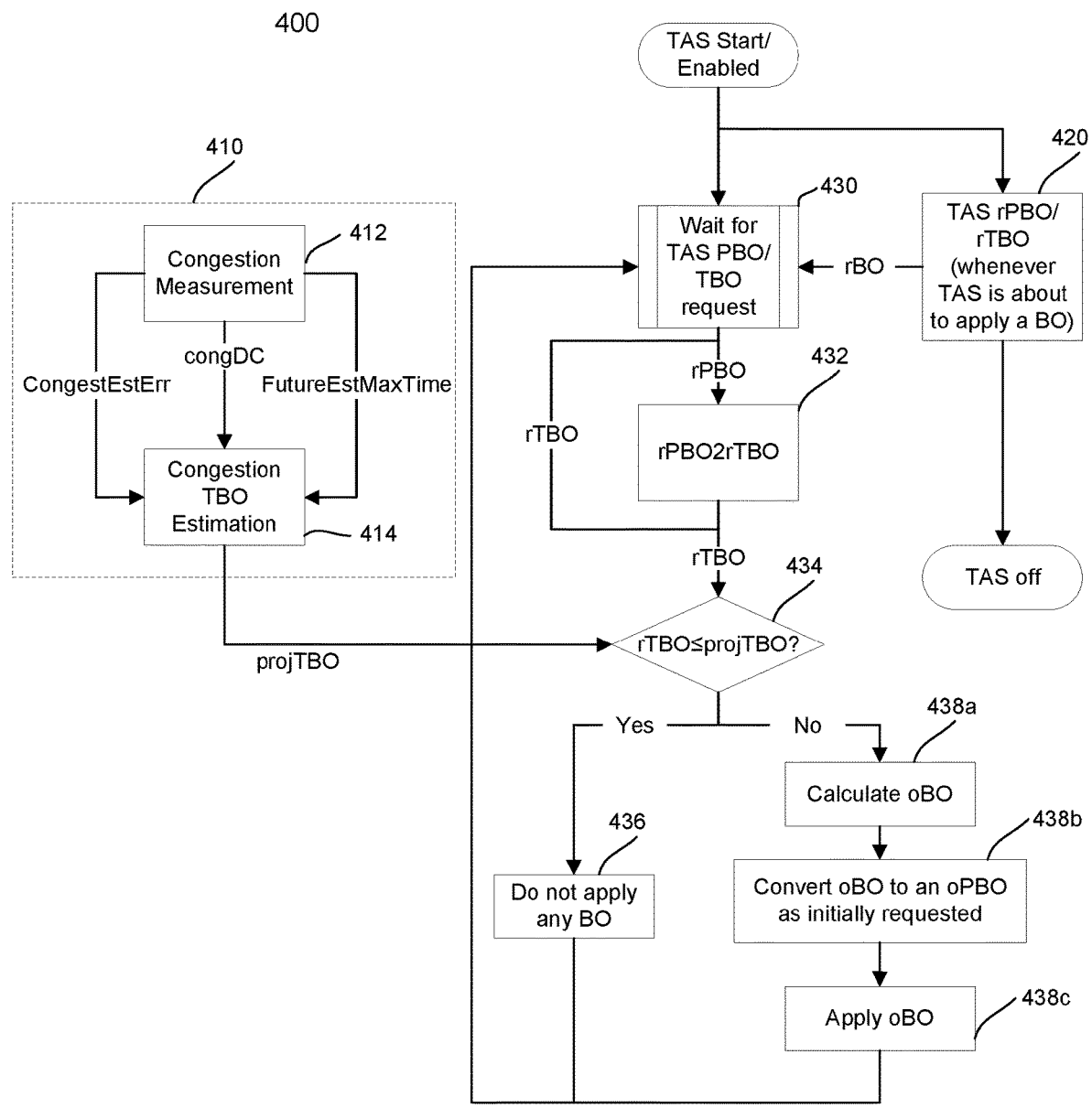
FIG. 4 exemplarily shows a flowchart according to some aspects.

FIG. 4 shows a flowchart 400 describing an exemplary method for determining whether and how to apply BOs based on communication channel congestion according to some aspects. It is appreciated that flowchart 400 is exemplary in nature and may thus be simplified for purposes of this explanation.

The method may include a congestion measurement and TBO estimation feature 410 to provide the projTBO. To determine the projTBO, the congestion of the communication channel may first be measured 412. In some aspects, this may be performed by one or more of the following four options.

A first option may include using an average total BO (AvgTotBO) while transmission (Tx) First-In, First-Out (FIFO) queues are not empty versus an average BO when the channel is not busy. The TX FIFO queues may include data transmissions that have been generated for transmission but are still waiting to be actually transmitted from the device.

For certain wireless implementations, the minimum Contention Window (CWmin) may be used since it provides the factor of added BO as determined by a clear channel assessment (CCA) check. The CCA, for example, may determine that the communication channel is busy by detecting energy levels that exceed a threshold. While the CWmin is the initial BO range (e.g., [0, . . . , CWmin]) distributed evenly, the average BO when the channel is not busy may be defined as CWmin/2. So, the factor of waiting for a transmission to access the channel may be defined as AvgTotBO/CWmin/2, which is equivalent to 2(AvgTotBO)/CWmin. A similar option to get a similar indication of the congestion level may be by calculating the average time there are no transmissions when Tx FIFO queues are not empty or by calculating the average channel-busy time that the CCA determines based on the detected energy being above the CCA energy detection threshold.

For this first option, the fixed FIFO queues may include data waiting to be transmitted, so the congestion measurements may be based on the cumulative BO. Also, the communication channel may be determined to be busy based on larger average BO times and based on longer durations of data in the FIFO queues waiting to be transmitted.

A second option may include averaging the number of frames that the device detects are transmitted by a common network access node or base station (e.g., a gNB) that are intended for other devices. A higher number of frames intended for other devices may directly indicate that there is a higher number of devices competing for resources, and thus, directly correlate with the congestion levels in the communication channel. The detected frames intended for other devices may be determined based on device addresses (e.g., a Network Interface Card (NIC) address) that do not correlate with the address of the device in use. Moreover, the degree of congestion may also be estimated based on the number of frames intended for other devices.

A third option may include a Tx FIFO in/out ratio, i.e., a gradient of the FIFO queue "fullness" level. When there are more data transmission inputs to the FIFO queue from the host/driver than the amount of transmissions leaving the FIFO queue and being transmitted, this may be an indication that there may be blockage or back-pressure in the communication channel not allowing the device to access the communication channel. This indication may also be derived from calculating the gradient of the FIFO queue fullness level. If the gradient is staying at the same level (or going down), then this is an indication that the communication channel is free or experiencing limited congestion.

A fourth option may include reducing the Tx power to a level where a packet error rate (PER) is slightly below a level that would trigger a reduction in Tx rate by a link quality controller, then forcing the Tx rate down from a stable working Tx rate and checking the ensuing PER. If the PER is above a predefined level, this may indicate congestion due to collisions. When forcing the rate down from a stable working Tx rate, it should reduce the PER since a lower Tx rate has either better coding protection, lower modulation, or better Tx diversity that may protect data from being lost by a channel state or range. If the PER is not going down to a certain expected value, this may indicate that the cause is not the channel state or noise, but it is rather caused by more packet collisions, and thus, may be used to indicate a congested communication channel. In this fourth option, the data transmissions are being controlled to a certain rate. For example, certain wireless communication protocols (e.g., LTE, 5G, WLAN) may choose different PHY rates based on statistics of errors that are measured (e.g., based on Acknowledgements (ACKs), etc.) Based on this chosen PHY transmission rate, this fourth option may force the rate a step down. If the PER remains the same or is largely unaltered, this indicates that there are more collisions over the air (OTA), meaning that the communication channel may be highly congested.

The four options provided above either detect congestion OTA above a limit or detect an amount of collisions. For certain channel conditions or for different accuracy requirements of the congestion measurement 412, the selection of any one of the four options provided above may change. In some aspects, a combination of the above four options (e.g., two, three, or all four options) may be utilized in determining the congestion measurement 412. In the case a combination of options is used, different weights may be applied to each of the options based on different factors. For example, in cases where there is a larger number of "hidden" nodes or devices in a system, the fourth option may carry a higher weight than it otherwise would have.

Accordingly, the congestion measurement 412 may provide the congDC based on any one or combination of the options described above. In addition, a congestion estimation error (CongestEstErr) and a future estimation maximum time (FutureEstMaxTime) may be computed assuming that the congestion level changes relatively slowly in time and over the order of the length of an averaging time window. The CongestEstErr and the FutureEstMaxTime may be computed or estimated based on the heuristics for the selected methods for computing the congDC. For example, either one may be determined based on the other, i.e., the CongestEstErr based on the FutureEstMaxTime, or vice versa, while each calculation in a real scenario may supply a set of parameter values for determining each of the values. In some aspects, the CongEstErr may also be attributed as a safety margin defined a priori.

For the future congestion estimation, assuming that the congestion level changes relatively slowly in time and more than the order of the TAS averaging window, the CongestEstErr may be expected to be limited, allowing the TAS to use the congestion calculation as the estimated congestion level for the near future with an expected CongestEstErr. The FutureEstMaxTime may be defined by the congestion measurement 412 which may impact how much the TAS mechanism will be able to use future energy estimations. This is an optional step and may be determined by indications given by the congestion level.

The congestion measurement 412 feature may therefore provide the congDC, the CongestEstErr, and/or the FutureEstMaxTime, and may recalculate any of the parameters each time there is an indication that the communication channel has changed or at the expiration of a channel aging timer. The indication that the communication channel has changed may be determined based on any of the congestion measurement options described herein whose value exceeds a pre-defined threshold. The timer may be based on one or more historical parameters of the communication channel and may vary based on whether the communication channel conditions are dynamic or static. In a more dynamic scenario (e.g., fast moving, environment with a high number of devices, etc.), a value of the channel aging timer may be lower than more static scenarios.

After determining the congDC based on the congestion of the communication channel, it may be used in the Congestion TBO Estimation 414 step to determine the projected time back-off (projTBO). The projTBO may, for example, be determined for the next data packet to be transmitted. The projTBO may be additionally based on the CongestEstErr and/or the FutureEstMaxTime, if applicable. In some aspects, the projTBO may be determined by a minimum function between the congDC reduced by the CongestEstErr for estimations safety margins and the FutureEstMaxTime in order to further limit the projTBO within the risk of future estimates. The projTBO may be, therefore, determined based on the following equation:

$$projTBO = Min[(congDC - CongestEstErr), FutureEstMaxTime] \quad (1)$$

Once the projTBO is determined, it may be used to adjust the TAS energy balance remaining in the transmission energy budget to recalculate any additional rPBOs or rTBOs requested from the TAS mechanism 420. This may be done by a few options.

A first option includes directly adding the projTBO as an extra energy credit to an energy integral comparator of the TAS 420 in charge of computing and tracking the transmission energy spent over a time averaging window so as to comply with SAR regulatory measures. By adding the projTBO as extra energy credit to the energy budget available for use in transmissions over a time window, the TAS 420 may allow for increased power for transmissions than it otherwise would have allowed and therefore reduce requested BOs.

A second option is to receive the requested BO (rBO) from the TAS mechanism 520 to check whether the projTBO compensates for it. This option, therefore, predicts for the very near future next Tx data packet. Features 430-438c further illustrate this second option.

In 420, the TAS mechanism may provide a rBO. The rBO may be a requested TBO (rTBO) or a requested PBO (rPBO) and is based on historical knowledge of the transmission energy spent over a time averaging window and may be determined from an energy integral comparator. In other words, this rBO is based on a knowledge of past transmitter behavior (e.g., power levels) during an averaging window and on a transmission energy budget for the averaging window to comply with SAR regulations. In some aspects, the window may be based on regulatory considerations and may therefore fall within a range of the maximum durations defined by regulations for a particular geographic area and/or bandwidth. For example, these durations may be 30 seconds, 60 seconds, 100 seconds, 6 minutes, etc.

Once the rBO is received 430, if it is a rTBO, the method may proceed to 434. However, if the rBO is a rPBO, then in rPBO2rTBO 432, it is converted into an equivalent rTBO. This conversion may be calculated as the energy over a packet duration over the air (OTA) that the rPBO would save/reduce that may be equivalent to a TBO that would save the similar amount of energy without any PBO. This conversion may be calculated based on the following equation:

$$rPBO2rTBO = ((targetPWR - rPBOtargetPWR) * PackTOTA / targetPWR) \quad (2)$$

where rPBO2rTBO is the equivalent TBO of the rPBO, targetPWR is the target power in milliwatts, rPBOtargetPWR is the rPBO target power in milliwatts, and PackTOTA is the packet time OTA.

Once the rTBO is obtained (either directly as the rBO or by converting the rPBO to an equivalent rTBO in 432), it is compared to the projTBO in 434. If it is less than or equal to the projTBO, then no BO (either PBO or TBO) is applied 436 since the projTBO will more than compensate for the rBO energy and ensure that the device will stay within the transmission energy budget for complying with SAR regulatory parameters.

If the projTBO is less than the rTBO, then the method may proceed to perform 438a-438c for applying an optimized BO (oBO) rather than the rBO. The oBO may be calculated 438a in order to reduce the rTBO (either the original rBO or the converted rPBO) by the projTBO amount. The oBO may be calculated based on the following equation:

$$oBO = rTBO - projTBO \quad (3)$$

Then, if the initial request from the TAS in 430 came in as a rPBO, the oBO may be converted back to an optimized PBO (oPBO) in 438b. In 438c, the oBO (either optimized TBO (oTBO) or the oPBO) is applied. In this manner, the oBO may reduce the total rBO by factoring in a future projected BO to be induced by higher congestion levels, thereby still complying with SAR regulations while allowing higher Tx power for the next data packet.

In some aspects, other mechanisms may be utilized for providing the requested BOs. For example, in some aspects, the requested BOs may be provided by a chip temperature monitor configured to regulate the temperature of one or more chips of a device. In this manner, upon detecting that the chip temperature is nearing a certain threshold, the chip temperature monitor may issue a requested BO in an effort to regulate the chip temperature prior to the device overheating. The projTBOs may be used in a similar manner to determine whether they may sufficiently compensate for the requested BOs or if an optimized BO may be implemented instead.

Figure 5:
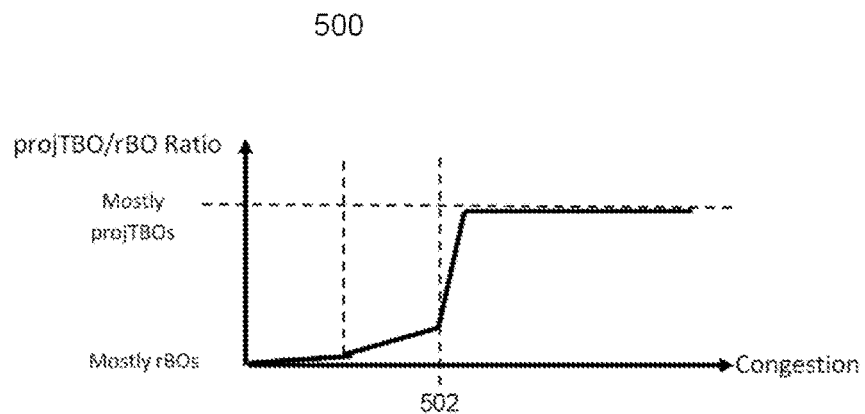
FIG. 5 exemplarily shows a chart illustrating the requested BOs that may be applied by a TAS compared to projected BOs according to some aspects.

FIG. 5 is a graph 500 illustrating the ratio of the projTBOs to rBOs as a function of the congestion levels according to some aspects. It is appreciated that graph 500 is exemplary in nature and may therefore be simplified for purposes of this explanation.

In graph 500, the congestion level is provided on the x-axis and the ratio of projTBOs to rBOs is provided on the y-axis. As shown in graph 500, when the congestion levels are low, the TAS mechanisms according to aspects of this disclosure may mostly consider the rBOs when determining whether any BOs need to be applied. This may include calculating the oBOs and applying them. As the congestion levels increase, however, fewer rBOs may be applied as explicitly requested and the impact of the projTBOs increases. Line 502 illustrates when the congestion induced DC is equivalent to the ratio of the SAR fixed limit to the target transmission power without any SAR fixed limit, i.e., DC≈SARvalue/MaxPWRnoSAR. As the congestion approaches 502, this is the point at which the projTBOs start to compensate for any requested BOs based on historical Tx power levels in view of SAR transmission energy budgets, so the rBOs may no longer be implemented. For exemplary purposes, if the SAR fixed limit Tx power value is 10 dB and the maximum Tx power allowed for packets without SAR considerations is 13 dB, then the ratio of 10 dB to 13 dB provides a gap of 3 dBs, corresponding to a 50% DC.

Figure 6:
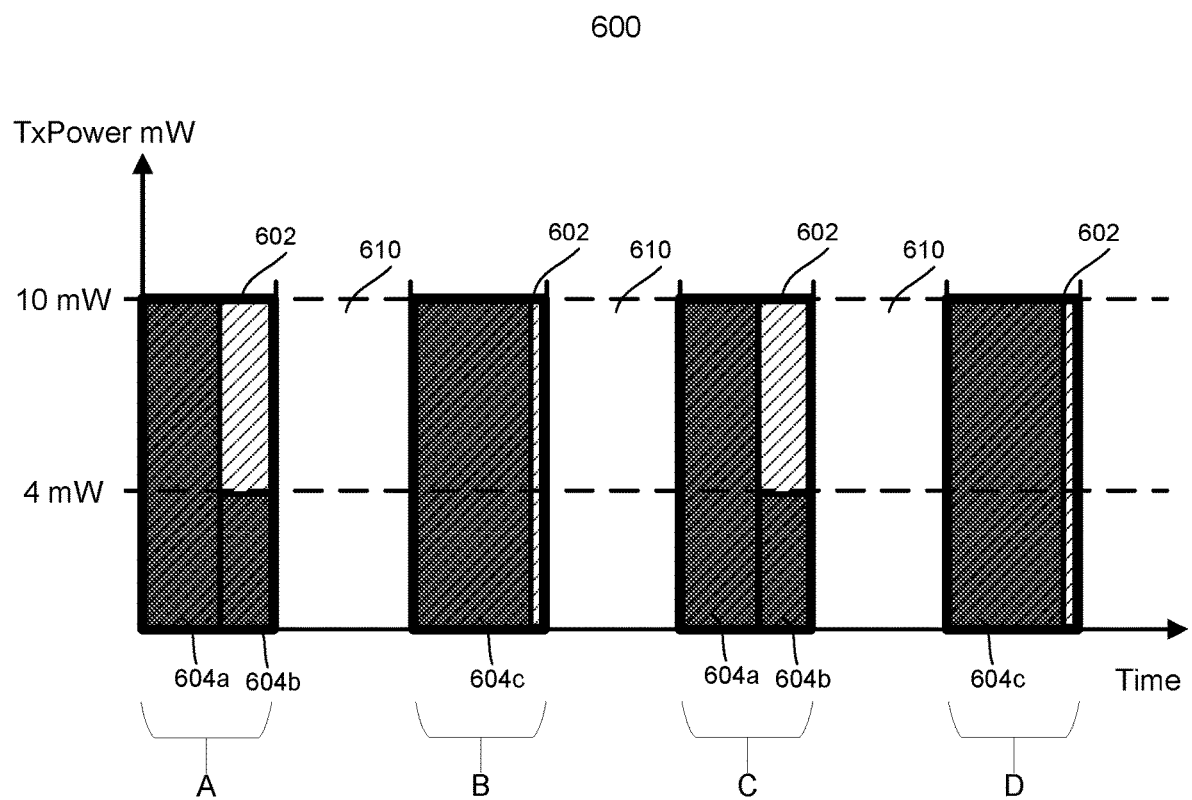
FIG. 6 exemplarily shows a chart illustrating transmission target power times with and without the method according to some aspects.

FIG. 6 is a graph 600 illustrating a comparison of the Tx target power versus time showing the benefits of the methods described herein according to some aspects. It is appreciated that graph 600 is exemplary in nature and may therefore be simplified for purposes of this explanation.

In graph 600, the Tx power (TxPower) in milliWatts (mW) is provided on the y-axis and time is provided on the x-axis. The use case shown in graph 600 is at 50% congestion providing a 50% congDC. The ratio of non-TAS fixed SAR power limit to target Tx power without any SAR fixed limits (SARvalue/MaxPWRnoSAR) is 4 mW/10 mW=40%.

The rectangles 602 with the thick borders and diagonal markings represent the Tx power using the methods described herein. As shown in each of windows A-D, the Tx power provided by the methods of this disclosure 602 is at the maximum power, i.e., 10 mW, for the entire duration of each of the windows. This shows that no BOs are applied by the TAS mechanism according to this disclosure (e.g., as provided by method flowchart 400) during each of A-D. The BOs induced by the 50% congestion levels, corresponding to time periods 610 between the time windows A-D, more than compensate for the total Tx energy spent in each of A-D for SAR transmission energy budget considerations. In other words, since the methods described herein account for the BOs induced by congestion when factoring in how much Tx power to use for the next data packet, maximum Tx power may be used for the during windows A-D.

The rectangles 604a-c with the thinner borders and shading superimposed on top of rectangles 602 represent the Tx power of conventional TAS methods that do not use the schemes and methods described herein. As shown in each of windows A and C, for example, BOs are applied, i.e., there is max power at 10 mW in 604a and PBOs are applied in 604b to reduce the Tx power to the SARvalue of 4 mW. As shown in 600, without using the methods described herein, there is an unnecessary application of PBOs in 604b that result in failing to fully exploit an available TAS transmission energy budget.

Figure 7:
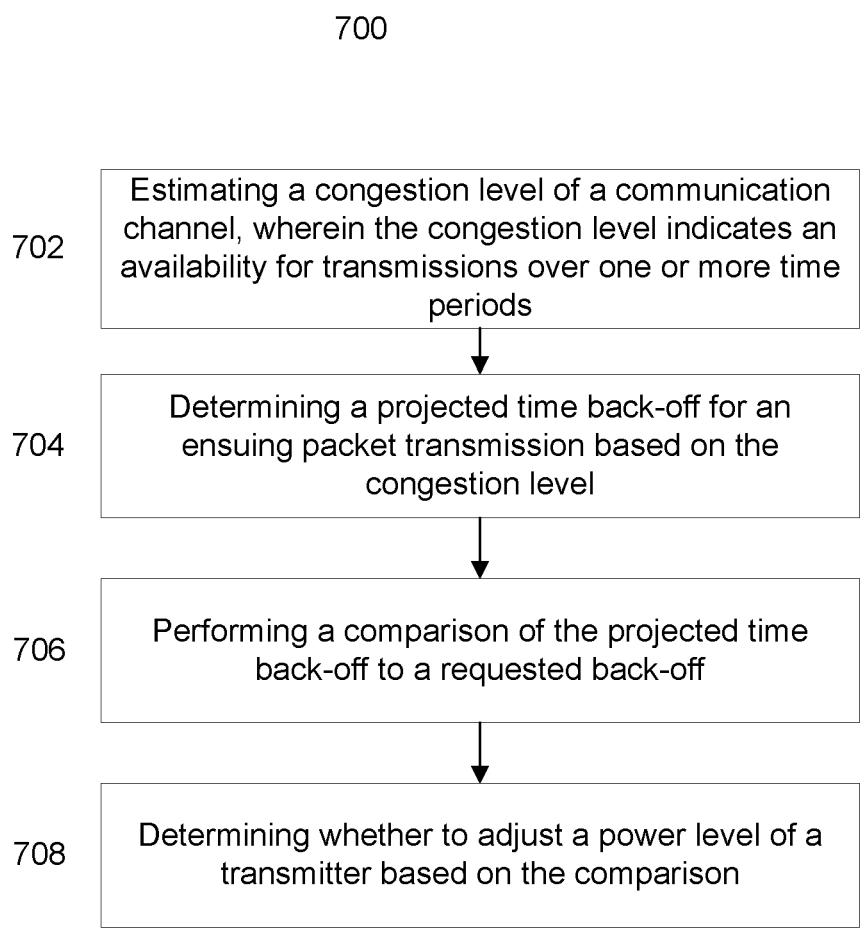
FIG. 7-8 exemplarily show flowcharts according to some aspects.

FIG. 7 shows a flowchart 700 illustrating a method according to some aspects. It is appreciated that flowchart 700 is exemplary in nature and may therefore be simplified for purposes of this explanation.

The method may include estimating a congestion level of a communication channel, wherein the congestion level indicates an availability for transmissions over one or more time periods 702; determining a projected time back-off for an ensuing packet transmission based on the congestion level 704; performing a comparison of the projected time back-off to a requested back-off 706; and determining whether to adjust a power level of a transmitter based on the comparison 708. In some aspects, the method may further include other features as described herein.

Figure 8:
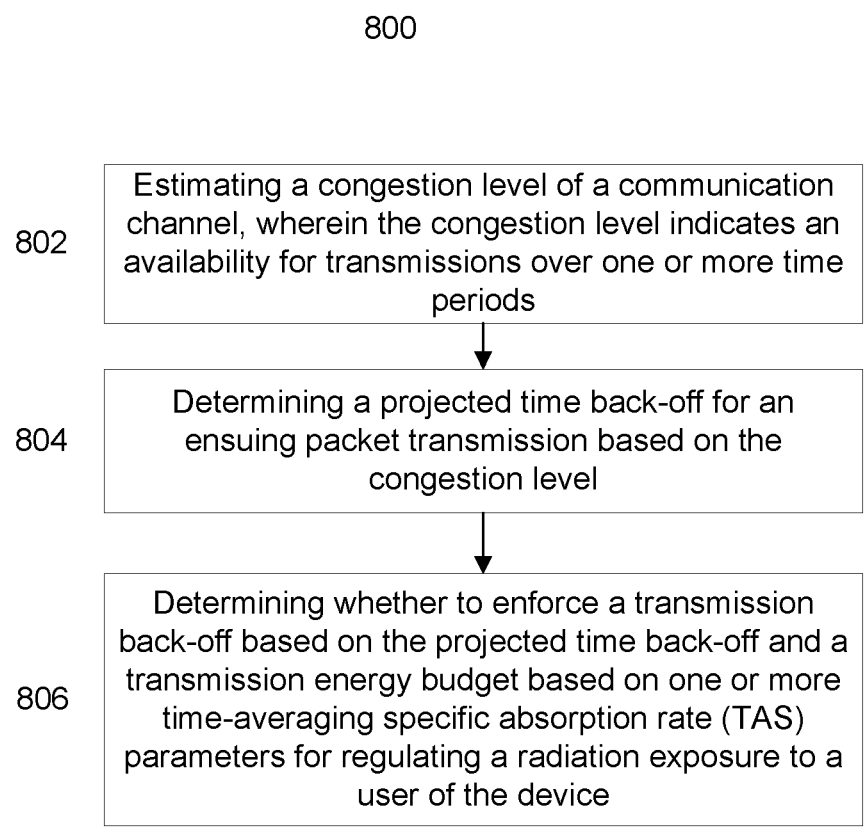

FIG. 8 shows a flowchart 800 illustrating a method according to some aspects. It is appreciated that flowchart 800 is exemplary in nature and may therefore be simplified for purposes of this explanation.

The method may include estimating a congestion level of a communication channel, wherein the congestion level indicates an availability for transmissions over one or more time periods 802; determining a projected time back-off for an ensuing packet transmission based on the congestion level 804; and determining whether to enforce a transmission back-off based on the projected time back-off and a transmission energy budget based on one or more time-averaging specific absorption rate (TAS) parameters for regulating a radiation exposure to a user of the device 806. In some aspects, the method may further include other features as described herein.

Figure 9:
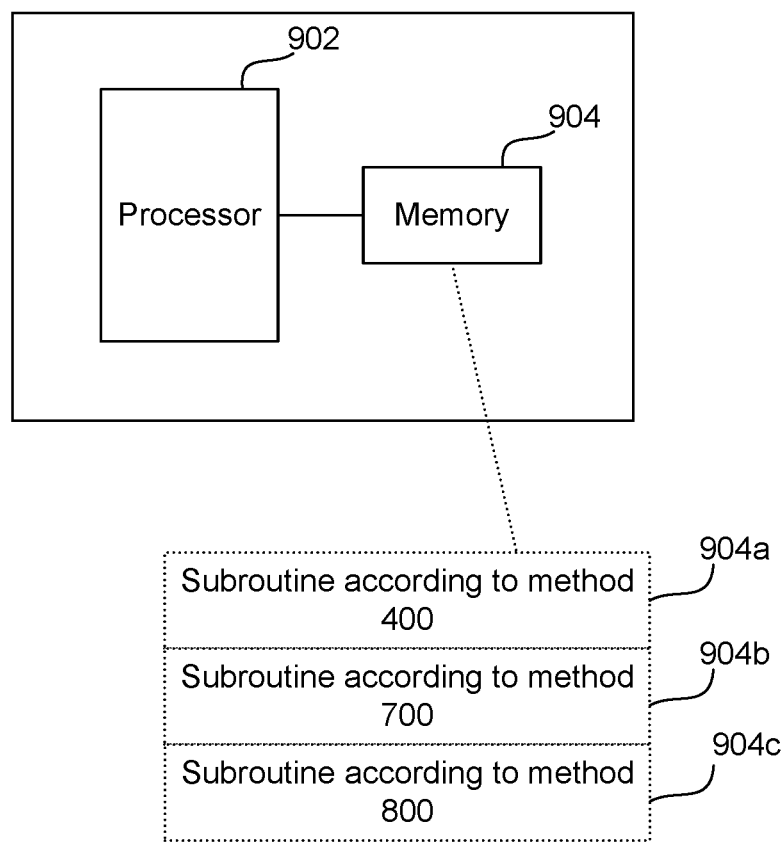
FIG. 9 exemplarily shows an internal configuration of baseband modem according to some aspects.

FIG. 9 shows an internal configuration of a baseband modem according to some aspects. As shown in FIG. 9, the terminal device may include processor(s) 902 and memory 904. Processor(s) 902 may be a single processor or multiple processors, and may be configured to retrieve and execute program code to perform the methods as described herein. For example, processor(s) 902 may be included in a baseband modem and/or an application processor of the terminal device. Processor(s) 902 may transmit and receive data over a software-level connection.

Memory 904 may be a non-transitory computer readable medium storing sub-routine instructions 904a, 904b, and/or 904c. Memory 904 may be a single memory or may be multiple memories, and may be included as internal memories to processor(s) 902 or may be external to processor(s) 902. Memory 904 may be a non-transitory computer readable medium storing one or more sets subroutine instructions for executing one or more of the methods described herein, e.g., methods 400, 700, or 800. In some aspects, memory 904 may include further subroutine instructions for implementing other aspects of this disclosure.

The following examples pertain to further aspects of this disclosure:

Example 1 is a device including one or more processors configured to estimate a congestion level of a communication channel, wherein the congestion level indicates an availability for transmissions over one or more time periods; determine a projected time back-off for an ensuing packet transmission based on the congestion level; perform a comparison of the projected time back-off to a requested back-off; and determine whether to adjust a power level of a transmitter based on the comparison.

In Example 2, the subject matter of Example(s) 1 may include wherein the congestion level is estimated by one or more of: estimating an average total back-off time for a number of packets waiting to be transmitted; estimating a quantity of frames received from a network access node that are allocated for other wireless devices; estimating a change in the number of packets waiting to be transmitted over time; and/or decreasing a transmission rate of data packets and measuring a change in packet error rate (PER) based on the decreased transmission rate.

In Example 3, the subject matter of Example(s) 1-2 may include wherein the projected time back-off is additionally based on one or more of: a congestion estimation error indicating error margins in the congestion estimation, wherein the error margins factor into account a time-averaging window; or a future estimation maximum time indicating an impact the one or more TAS parameters will have in upcoming energy estimations.

In Example 4, the subject matter of Example(s) 3 may include wherein determining the projected time back-off includes determining a minimum of: a difference between the congestion level and the congestion estimation error; and the future estimation maximum time.

In Example 5, the subject matter of Example(s) 1-4 may include wherein the requested back-off is based on one or more time-averaging specific absorption rate (TAS) parameters.

In Example 6, the subject matter of Example(s) 1-5 may include wherein the requested back-off is based on regulating a chip temperature associated with the device.

In Example 7, the subject matter of Example(s) 1-6 may include wherein the requested back-off includes a requested time-back off.

In Example 8, the subject matter of Example(s) 1-6 may include wherein the requested back-off includes a requested power back-off.

In Example 9, the subject matter of Example(s) 8 may include the one or more processors configured to determine whether a conversion of the requested back-off is required if the requested back-off includes the requested power back-off, wherein the requested power back-off is converted into an equivalent requested time back-off based on an estimated energy saving for a packet duration over the air that the requested power back-off would introduce.

In Example 10, the subject matter of Example(s) 1-9 may include the comparison of the projected time back-off to the requested back-off including a real-time comparison of the projected time back-off to the requested back-off.

In Example 11, the subject matter of Example(s) 1-10 may include wherein if the requested back-off is less than or equal to the projected time back-off, the one or more processors are configured to not adjust the power level of the transmitter based on the comparison.

In Example 12, the subject matter of Example(s) 1-11 may include wherein if the requested back-off is greater than the projected time back-off, the one or more processors are configured to adjust the power level of the transmitter based on the comparison.

In Example 13, the subject matter of Example(s) 12 may include wherein the one or more processors are configured to adjust the power level by an optimized back-off value determined from a difference between the projected time back-off and the requested back-off.

In Example 14, the subject matter of Example(s) 1-13 may include the one or more processors configured to add the projected time back-off to a transmission energy budget to increase transmission energy available at a current time, wherein the transmission energy budget includes an energy available for transmissions over a time window.

In Example 15, the subject matter of Example(s) 1-14 may include wherein the projected time back-off adds energy to a transmission energy budget, wherein the transmission energy budget includes an energy available for transmissions over a time window.

In Example 16, the subject matter of Example(s) 14-15 may include wherein the transmission energy budget is based on one or more time-averaging specific absorption rate (TAS) parameters for regulating a radiation exposure to a user of the device.

Example 17 is a device including one or more processors configured to: estimate a congestion level of a communication channel, wherein the congestion level indicates an availability for transmissions over one or more time periods; determine a projected time back-off for an ensuing packet transmission based on the congestion level; and determine whether to enforce a transmission back-off based on the projected time back-off and a transmission energy budget based on one or more time-averaging specific absorption rate (TAS) parameters for regulating a radiation exposure to a user of the device.

In Example 18, the subject matter of Example(s) 17 may include wherein the congestion level is estimated by one or more of: estimating an average total back-off time for a number of packets waiting to be transmitted; estimating a quantity of frames received from a network access node that are allocated for other wireless devices; estimating a change in the number of packets waiting to be transmitted over time; and/or decreasing a transmission rate of data packets and measuring a change in packet error rate (PER) based on the decreased transmission rate.

In Example 19, the subject matter of Example(s) 17-18 may include wherein the projected time back-off is additionally based on one or more of: a congestion estimation error indicating error margins in the congestion estimation, wherein the error margins factor into account a time-averaging window; or a future estimation maximum time indicating an impact the one or more TAS parameters will have in upcoming energy estimations.

In Example 20, the subject matter of Example(s) 19 may include wherein determining the projected time back-off includes determine a minimum of: a difference between the congestion level and the congestion estimation error; and the future estimation maximum time.

In Example 21, the subject matter of Example(s) 17-20 may include the one or more processors configured to add the projected time back-off to a transmission energy budget to increase transmission energy available at a current time, wherein the transmission energy budget includes an energy available for transmissions over a time window.

In Example 22, the subject matter of Example(s) 17-21 may include wherein the projected time back-off adds energy to a transmission energy budget, wherein the transmission energy budget includes an energy available for transmissions over a time window.

In Example 23, the subject matter of Example(s) 21-22 may include wherein the transmission energy budget is based on one or more time-averaging specific absorption rate (TAS) parameters for regulating a radiation exposure to a user of the device. The one or more TAS parameters may include a time window or an average transmission power limit. The time window may be 30 seconds, 60 seconds, 100 seconds, or 6 minutes, for example, and may be established by regulatory limits and therefore depend on a geographic region (e.g., a country) or a channel band. The average transmission power limit may include an average transmission power over the time window to ensure that the transmission energy budget is not exceeded.

In Example 24, the subject matter of Example(s) 17-23 may include the one or more processors configured to determine whether a conversion of the transmission back-off is required if the transmission back-off includes a requested power back-off, wherein the requested power back-off is converted into an equivalent requested time back-off based on an estimated energy saving for a packet duration over the air that the requested power back-off would introduce.

In Example 25, the subject matter of Example(s) 24 may include wherein the one or more processors are configured to determine the equivalent requested time back-off based on a current transmission power, a target transmission power which would be induced by the requested power back-off, and an over the air (OTA) time of a packet duration.

Example 26 is a method including: estimating a congestion level of a communication channel, wherein the congestion level indicates an availability for transmissions over one or more time periods; determining a projected time back-off for an ensuing packet transmission based on the congestion level; performing a comparison of the projected time back-off to a requested back-off; and determining whether to adjust a power level of a transmitter based on the comparison.

In Example 27, the subject matter of Example(s) 26 may include estimating the congestion level by one or more of: estimating an average total back-off time for a number of packets waiting to be transmitted; estimating a quantity of frames received from a network access node that are allocated for other wireless devices; estimating a change in the number of packets waiting to be transmitted over time; and/or decreasing a transmission rate of data packets and measuring a change in packet error rate (PER) based on the decreased transmission rate.

In Example 28, the subject matter of Example(s) 26-27 may include basing the projected time back-off on one or more of: a congestion estimation error indicating error margins in the congestion estimation, wherein the error margins factor into account a time-averaging window; or a future estimation maximum time indicating an impact the one or more TAS parameters will have in upcoming energy estimations.

In Example 29, the subject matter of Example(s) 28 may include wherein determining the projected time back-off includes determining a minimum of: a difference between the congestion level and the congestion estimation error; and the future estimation maximum time.

In Example 30, the subject matter of Example(s) 26-29 may include wherein the requested back-off is based on one or more time-averaging specific absorption rate (TAS) parameters.

In Example 31, the subject matter of Example(s) 26-30 may include wherein the requested back-off is based on regulating a chip temperature associated with the device.

In Example 32, the subject matter of Example(s) 26-31 may include wherein the requested back-off includes a requested time-back off.

In Example 33, the subject matter of Example(s) 26-31 may include wherein the requested back-off includes a requested power back-off.

In Example 34, the subject matter of Example(s) 33 may include determining whether a conversion of the requested back-off is required if the requested back-off includes the requested power back-off, wherein the requested power back-off is converted into an equivalent requested time back-off based on an estimated energy saving for a packet duration over the air that the requested power back-off would introduce.

In Example 35, the subject matter of Example(s) 26-34 may include the comparison of the projected time back-off to the requested back-off including a real-time comparison of the projected time back-off to the requested back-off.

In Example 36, the subject matter of Example(s) 26-35 may include wherein if the requested back-off is less than or equal to the projected time back-off, further including deciding to not adjust the power level of the transmitter based on the comparison.

In Example 37, the subject matter of Example(s) 26-35 may include wherein if the requested back-off is greater than the projected time back-off, further including adjusting the power level of the transmitter based on the comparison.

In Example 38, the subject matter of Example(s) 26-37 may include adjusting the power level by an optimized back-off value determined from a difference between the projected time back-off and the requested back-off.

In Example 39, the subject matter of Example(s) 26-38 may include adding the projected time back-off to a transmission energy budget to increase transmission energy available at a current time, wherein the transmission energy budget includes an energy available for transmissions over a time window.

In Example 40, the subject matter of Example(s) 26-39 may include adding energy to a transmission energy budget based on the projected time back-off, wherein the transmission energy budget includes an energy available for transmissions over a time window.

In Example 41, the subject matter of Example(s) 38-40 may include wherein the transmission energy budget is based on one or more time-averaging specific absorption rate (TAS) parameters for regulating a radiation exposure to a user of the device.

Example 42 is a method including estimating a congestion level of a communication channel, wherein the congestion level indicates an availability for transmissions over one or more time periods; determining a projected time back-off for an ensuing packet transmission based on the congestion level; and determining whether to enforce a transmission back-off based on the projected time back-off and a transmission energy budget based on one or more time-averaging specific absorption rate (TAS) parameters for regulating a radiation exposure to a user of the device.

In Example 43, the subject matter of Example(s) 42 may include estimating the congestion level by one or more of: estimating an average total back-off time for a number of packets waiting to be transmitted; estimating a quantity of frames received from a network access node that are allocated for other wireless devices; estimating a change in the number of packets waiting to be transmitted over time; and/or decreasing a transmission rate of data packets and measuring a change in packet error rate (PER) based on the decreased transmission rate.

In Example 44, the subject matter of Example(s) 42-43 may include wherein the projected time back-off is additionally based on one or more of: a congestion estimation error indicating error margins in the congestion estimation, wherein the error margins factor into account a time-averaging window; or a future estimation maximum time indicating an impact the one or more TAS parameters will have in upcoming energy estimations.

In Example 45, the subject matter of Example(s) 44 may include determining the projected time back-off by determining a minimum of: a difference between the congestion level and the congestion estimation error; and the future estimation maximum time.

In Example 46, the subject matter of Example(s) 42-45 may include adding the projected time back-off to a transmission energy budget to increase transmission energy available at a current time, wherein the transmission energy budget includes an energy available for transmissions over a time window.

In Example 47, the subject matter of Example(s) 42-46 may include adding energy to a transmission energy budget based on the projected time back-off, wherein the transmission energy budget includes an energy available for transmissions over a time window.

In Example 48, the subject matter of Example(s) 42-47 may include wherein the transmission energy budget is based on one or more time-averaging specific absorption rate (TAS) parameters for regulating a radiation exposure to a user of the device.

Example 49 one or more non-transitory computer-readable media storing instructions thereon that, when executed by at least one processor of a terminal device, direct the terminal device to perform a method according to any one of Examples 26-48.

Example 50 is a device including means to estimate a congestion level of a communication channel, wherein the congestion level indicates an availability for transmissions over one or more time periods; means to determine a projected time back-off for an ensuing packet transmission based on the congestion level; and means to determine whether to enforce a transmission back-off based on the projected time back-off and a transmission energy budget based on one or more time-averaging specific absorption rate (TAS) parameters for regulating a radiation exposure to a user of the device. The device may also include means to perform other features recited in the Examples herein.

Example 51 is a device including means to estimate a congestion level of a communication channel, wherein the congestion level indicates an availability for transmissions over one or more time periods; means to determine a projected time back-off for an ensuing packet transmission based on the congestion level; means to perform a comparison of the projected time back-off to a requested back-off; and means to determine whether to adjust a power level of a transmitter based on the comparison. The device may also include means to perform other features recited in the Examples herein.

Example 52 is a device including an estimator configured to estimate a congestion level of a communication channel, wherein the congestion level indicates an availability for transmissions over one or more time periods; a determiner configured to determine a projected time back-off for an ensuing packet transmission based on the congestion level; and a determiner configured to determine whether to enforce a transmission back-off based on the projected time back-off and a transmission energy budget based on one or more time-averaging specific absorption rate (TAS) parameters for regulating a radiation exposure to a user of the device. The device may also include means to perform other features recited in the Examples herein.

Example 53 is a device including an estimator configured to estimate a congestion level of a communication channel, wherein the congestion level indicates an availability for transmissions over one or more time periods; a determiner configured to determine a projected time back-off for an ensuing packet transmission based on the congestion level; a comparator configured to perform a comparison of the projected time back-off to a requested back-off; and a determiner configured to determine whether to adjust a power level of a transmitter based on the comparison. The device may also include means to perform other features recited in the Examples herein.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A device comprising a processor configured to:
   estimate a congestion level of a communication channel, wherein the congestion level indicates an availability for transmissions over at least one time period;
   determine a projected time back-off for an ensuing packet transmission based on the congestion level; and
   determine whether to apply a transmission back-off based on the projected time back-off and a transmission energy budget based on at least one time-averaging specific absorption rate (TAS) parameter to regulate a radiation exposure.

2. The device of claim 1, wherein the congestion level is estimated by at least one of:
   estimating an average total back-off time for a number of packets waiting to be transmitted;
   estimating a quantity of frames received from a network access node that are allocated for other wireless devices;
   estimating a change in the number of packets waiting to be transmitted over time;
   and/or decreasing a transmission rate of data packets and measuring a change in packet error rate (PER) based on the decreased transmission rate.

3. The device of claim 1, wherein the projected time back-off is additionally based on at least one of:

a congestion estimation error indicating error margins in the congestion estimation, wherein the error margins factor into account a time-averaging window; or a future estimation maximum time indicating an impact the at least one TAS parameter will have in upcoming energy estimations.

4. The device of claim 3, wherein determining the projected time back-off comprises determining a minimum of:
a difference between the congestion level and the congestion estimation error; and
the future estimation maximum time.

5. The device of claim 1, wherein the processor is configured to add the projected time back-off to a transmission energy budget to increase transmission energy available at a current time, wherein the transmission energy budget comprises an energy available for transmissions over a time window.

6. The device of claim 5, wherein the least one TAS parameter to regulate the radiation exposure is to regulate the radiation exposure to a user, wherein at least one of the at least one TAS parameters comprises the time window or an average transmission power limit.

7. The device of claim 1, wherein the projected time back-off adds energy to the transmission energy budget, wherein the transmission energy budget comprises an energy available for transmissions over a time window.

8. The device of claim 1, wherein the processor is configured to determine whether a conversion of the transmission back-off is required if the transmission back-off comprises a requested power back-off, wherein the requested power back-off is converted into an equivalent requested time back-off based on an estimated energy saving for a packet duration over the air (OTA) that the requested power back-off would introduce.

9. The device of claim 8, wherein the processor is configured to determine the equivalent requested time back-off based on a current transmission power, a target transmission power which would be induced by the requested power back-off, and the packet duration OTA.

10. A method comprising:
estimating a congestion level of a communication channel, wherein the congestion level indicates an availability for transmissions over at least one time period;
determining a projected time back-off for an ensuing packet transmission based on the congestion level; and
determining whether to apply a transmission back-off based on the projected time back-off and a transmission energy budget based on at least one time-averaging specific absorption rate (TAS) parameter to regulate a radiation exposure.

11. The method of claim 10, further comprising estimating the congestion level by at least one of:
estimating an average total back-off time for a number of packets waiting to be transmitted;
estimating a quantity of frames received from a network access node that are allocated for other wireless devices;
estimating a change in the number of packets waiting to be transmitted over time; and/or
decreasing a transmission rate of data packets and measuring a change in packet error rate (PER) based on the decreased transmission rate.

12. The method of claim 10, wherein the projected time back-off is additionally based on at least one of:
a congestion estimation error indicating error margins in the congestion estimation, wherein the error margins factor into account a time-averaging window; or
a future estimation maximum time indicating an impact the at least one of the TAS parameters will have in upcoming energy estimations.

13. The method of claim 12, further comprising determining the projected time back-off by determining a minimum of:
a difference between the congestion level and the congestion estimation error; and
the future estimation maximum time.

14. The method of claim 10, further comprising adding the projected time back-off to a transmission energy budget to increase transmission energy available at a current time, wherein the transmission energy budget comprises an energy available for transmissions over a time window.

15. The method of claim 14, wherein the least one TAS parameter to regulate the radiation exposure is to regulate the radiation exposure to a user, wherein at least one of the at least one TAS parameters comprises the time window or an average transmission power limit.

16. The method of claim 10, further comprising:
determining whether a conversion of the transmission back-off is required if the transmission back-off comprises a requested power back-off; and
converting the requested power back-off into an equivalent requested time back-off based on an estimated energy saving for a packet duration over the air (OTA) that the requested power back-off would introduce.

17. The method of claim 16, further comprising:
determining the equivalent requested time back-off based on a current transmission power, a target transmission power which would be induced by the requested power back-off, and the packet duration OTA.

18. One or more non-transitory computer readable storage mediums with instructions stored thereon that, when executed by a processor of a device, cause the device to:
estimate a congestion level of a communication channel, wherein the congestion level indicates an availability for transmissions over at least one time period;
determine a projected time back-off for an ensuing packet transmission based on the congestion level; and
determine whether to apply a transmission back-off based on the projected time back-off and a transmission energy budget based on at least one time-averaging specific absorption rate (TAS) parameter to regulate a radiation exposure.

19. The one or more non-transitory computer readable storage mediums of claim 18, further comprising instructions to cause the device to estimate the congestion level by at least one of:
estimating an average total back-off time for a number of packets waiting to be transmitted;
estimating a quantity of frames received from a network access node that are allocated for other wireless devices;
estimating a change in the number of packets waiting to be transmitted over time; and/or
decreasing a transmission rate of data packets and measuring a change in packet error rate (PER) based on the decreased transmission rate.

20. The one or more non-transitory computer readable storage mediums of claim 18, further comprising instructions to cause the device to:
add the projected time back-off to a transmission energy budget to increase transmission energy available at a current time, wherein the transmission energy budget comprises an energy available for transmissions over a time window.

* * * * *